United States Patent [19]

George, Jr.

[11] Patent Number: 4,782,745

[45] Date of Patent: Nov. 8, 1988

[54] TORTILLA WARMER ASSEMBLY

[75] Inventor: Benjamin B. George, Jr., Santa Ana, Calif.

[73] Assignee: Tivoli Industries, Inc., Santa Ana, Calif.

[21] Appl. No.: 599,920

[22] Filed: Apr. 13, 1984

[51] Int. Cl.⁴ .................. A47J 39/00; A47J 36/34
[52] U.S. Cl. .......................... 99/483; 99/467; 126/369
[58] Field of Search .............. 99/467, 483, 516; 34/201, 233; 126/369, 348, 389, 386; 219/401

[56] References Cited

U.S. PATENT DOCUMENTS 157,897 12/1874 Welch .................... 126/369
4,013,869 3/1977 Orts .................... 99/483 X Primary Examiner—Timothy F. Simone
Attorney, Agent, or Firm—Nilsson, Robbins, Dalgarn, Berliner, Carson & Wurst

[57] ABSTRACT

The open end of a cylindrical or dome shaped cover closed at the other end fits snugly within the raised outer rim of a flat base formed of a heat transmitting material such as metal. A holder structure, preferably of lightweight metal supportable on the base to be enclosed within the cover, has one or more lightweight plates that are the approximate size and shape of a standard tortilla disposed in a roughly horizontal attitude one above the other. The base beneath the plates has concentric shallow liquid retaining areas to hold small amounts of water that can be heated and turned to steam to warm the tortillas and keep them pliant. Heat insulating handles on the cover and base permit the entire assembly to be placed over the heating element on a stove.

2 Claims, 2 Drawing Sheets

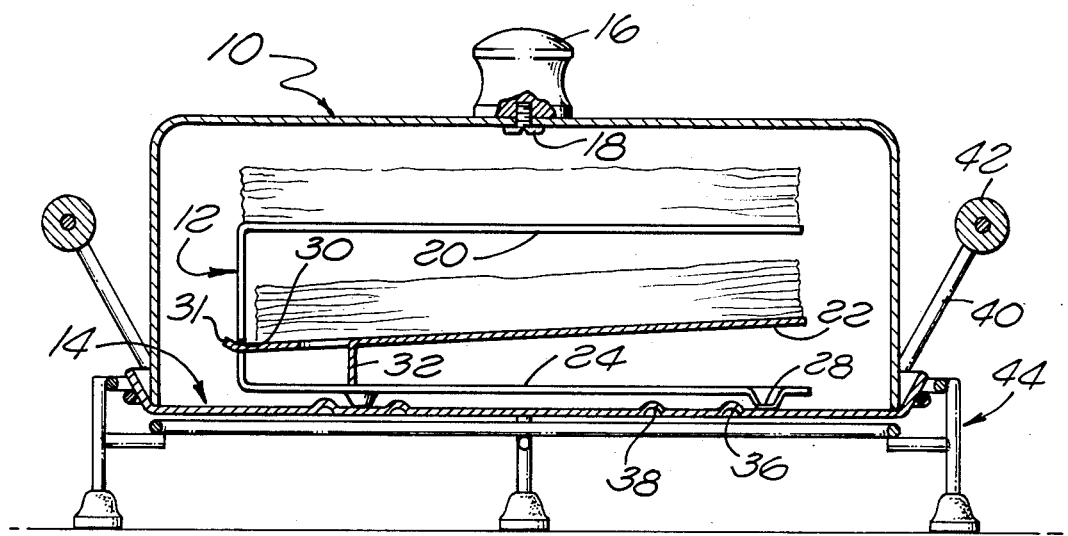
FIG. 2
FIG. 3
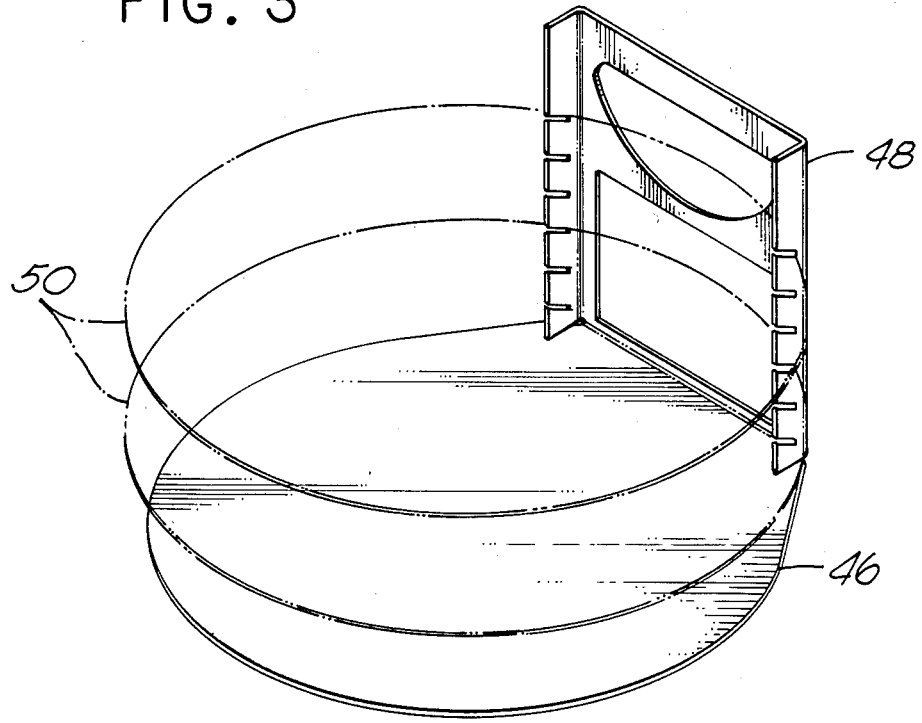

TORTILLA WARMER ASSEMBLY

FIELD OF THE INVENTION

This invention pertains to an assembly for warming tortillas while maintaining the natural moisture content so that they remain pliable and soft.

BACKGROUND OF THE INVENTION

Presently nothing is available to warm tortillas while maintaining their natural moisture level and texture once they are taken from their sealed packages. For many years tortillas have constituted one of the staple food products of most Latin American countries. Typically, they are folded around meat, bean or vegetable fillings, or simply eaten like bread either alone or with other foods at meals.

When tortillas are fresh, or when they are first taken from the sealed air tight packaging now used in mass marketing in modern stores, they have a natural moisture content that keeps them soft and pliable. However, it is often desirable to warm the tortilla before eating and, although many different methods are used, none is particularly good. For example, some people warm tortillas one at a time over an open flame, or lay them on a heated griddle or frying pan, which can not only burn them but also ruin their texture by drying them out. Sometimes tortillas are wrapped in moist hot towels where, after awhile, they tend to become soggy and fall apart. Typical steam table type warmer systems produce the same result.

Accordingly, the object of this invention is to produce some means for warming and serving tortillas while maintaining their natural texture, taste and moisture content.

SUMMARY OF THE INVENTION

The tortilla warmer assembly of this invention provides of a closed cylindrical or dome shaped cover with an open end that fits snugly within the raised outer rim of a flat base formed of some suitable metal alloy or other heat transmitting material. A holder structure formed of some lightweight metal alloy or the like is supported on the base beneath the cover to hold one or more plates, which are the approximate size and shape of a standard tortilla, disposed in a roughly horizontal attitude, one above the other so that one or more tortillas can be stacked on each plate to be held for heating.

Preferably the holder is a free standing structure that can be removed from the base to facilitate the loading of tortillas onto the individual plates. In the preferred form, the holder consists of a unitary metal stamping that defines upper and lower roughly circular plates parallel to each other and joined together along one side by an integral rectangular tab extending perpendicularly between the plate edges. An intermediate plate can be inserted between the upper and lower plates of the support structure in a horizontal slot in the connecting tab so that it also can be removed to facilitate loading the tortillas on it.

The base structure preferably is formed with a shallow, concentric fluid retaining reservoir areas at its center that are defined by raised circular ridges formed on the essentially flat upper surface. The periphery of the base is formed with a raised rim to fit snugly around the open end of the cover to provide a tight closure.

In use, depending on the number of tortillas to be served, one or more removed from an open package can be layed flat on the upper horizontal plate of the support structure. Similarly, the middle plate can be removed to facilitate placement of a comparable number of tortillas on it so that it can then be inserted into its slot in the horizontal tab forming one edge of the support structure. With a minimum number of tortillas, a small quantity of water is poured into the central reservoir area, whereas with greater numbers, more water could be added to fill the concentric areas. The support structure is then placed o the base structure with the tortillas on the upper and middle plate being held well above the upper base surface.

The cylindrical cover is lowered over the top so that the smooth bottom edge comes in contact with the adjacent number surface of the base just inside of the raised outer rim so that a relatively tight fit occurs. The entire structure is then lifted by the insulated handles attached to the base and placed over the burner of a gas or electric stove, for example, until a bit of condensed steam is seen escaping from the bottom of the cover. At that point, the structure assembly is simply removed from the burner to the dining area or table where the tortillas are kept warm by the combined action of the steam within the cover and the heat retained the metal or similar materials forming the base and cover.

The ability of this assembly to maintain the tortillas warm with the proper degree of moisture over extended periods of time is attributable to the combined effects of heating and subsequent cooling of the structure. During heating, the weight of the cover acts to provide a relatively tight seal around the periphery of the base at its open end so that a slight over pressure is created within the cover as the water in the small reservoir in the base is turned to steam. Subsequently, after the assembly is removed from the heat, the cooling that takes place by radiation from the cover and the base lowers the pressure under the cover to produce a slight vaccuum that forces the bottom edges of the cover tightly down against the base to seal off any further escape of the moisture and heated air from within.

BRIEF DESCRIPTION OF THE DRAWINGS

FIG. 2 is a cross-sectional view of the various elements of the tortilla warmer assembly placed in operative relationship with a load of tortillas;

FIG. 3 is a partial perspective view of an alternative form of holder and plate assembly that may be used for larger numbers of tortillas than the preferred embodiment shown in FIGS. 1 and 2.

DETAILED DESCRIPTION OF THE PREFERRED EMBODIMENT

Figure 1:
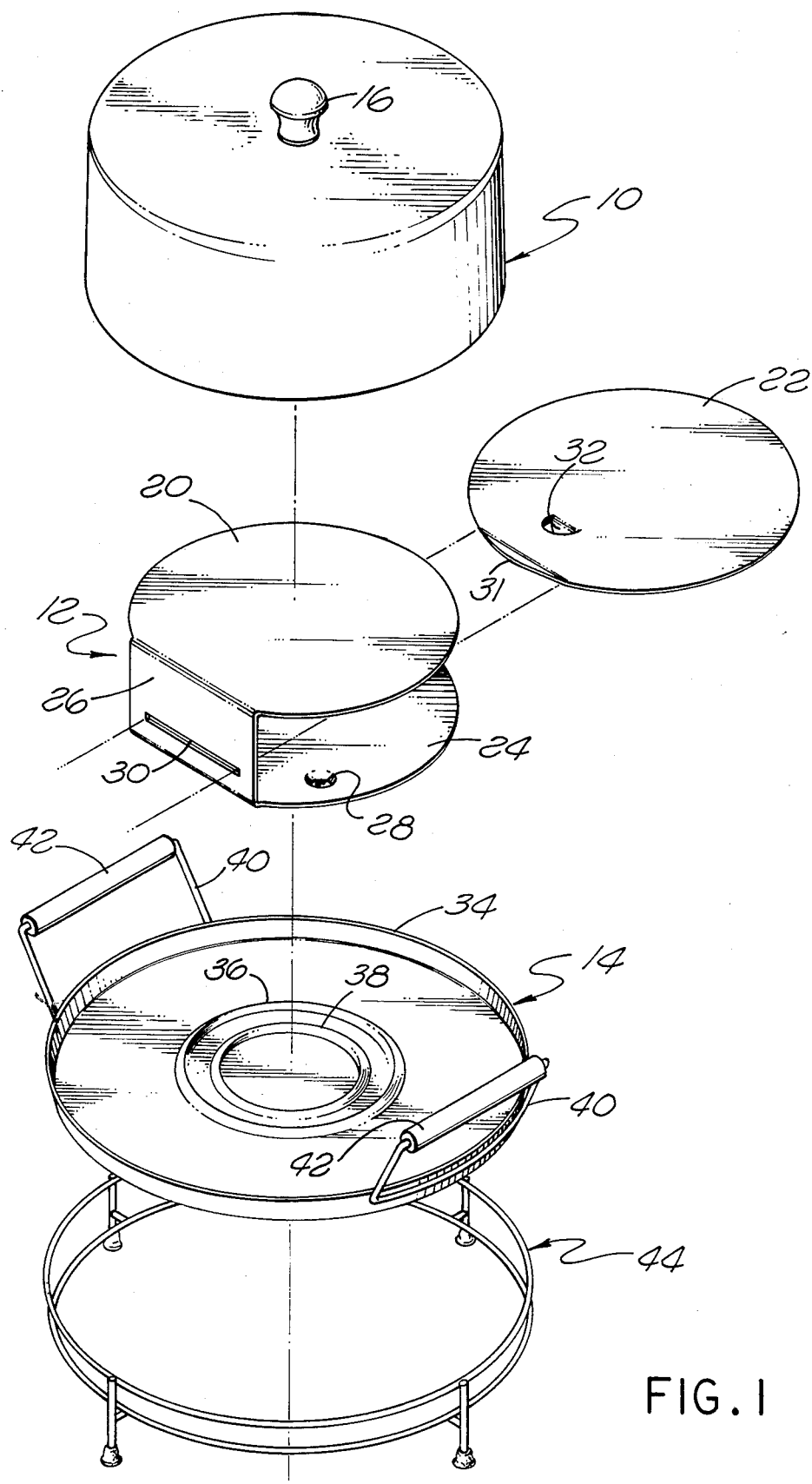
FIG. 1 is an exploded perspective view showing the various elements of a preferred form of the tortilla warmer assembly in accordance with the invention arranged in the order of their placement on an appropriate wire frame holder.

Referring now to FIG. 1, the tortilla warmer assembly of the invention consists essentially of a cylindrical or dome shaped cover 10, a holder structure 12, and a base 14, all preferably constructed of ligtweight metal alloy of the type commonly used in cooking utensils. The cover 10 is dome shaped or cylindrical with an upper closed end and a lower opened end. The lower edge surrounding the open end of the cover 10 is cut or machined on an even plane to fit snugly against the abutting flat upper surface of the base 14. The closed end is surmounted by a knob 16 made of wood, ceramic or other heat resistant material which may be secured to the cover by a screw 18 or the like, as shown in FIG. 2.

The holder structure in the preferred embodiment, as shown in FIGS. 1 and 2, is intended primarily for home use, and provides an upper fixed plate 20 and a removable middle plate 22 for stacking the tortillas to be warmed. The holder structure 12 with the removable central plate 22 is preferably formed of a lightweight aluminum alloy stamping having two roughly circular lobes forming the upper plate 20 and a lower plate 24 joined by a rectangular tab 26. The lower plate 24 has three or more downwardly extending dimples 28 that rest on the base 14 to support it above the upper surface of the base 14.

The connecting tab 26 has a narrow horizontal slot 30 cut into it intermediate the upper and lower circular plates 20 and 24 of the holder structure. The slot is wide enough to permit insertion of the back edge 31 of the middle plate 22 which is bent slightly upward to lock it in place after insertion A semi-circular tab 32 is cut or punched out of the plate 22 a short distance from the bent back edge 31 to provide cantilevered support of the plate 22, as best seen in FIG. 2.

The base 14 consists of an essentially flat metal (or possibly heat transmitting ceramic) piece having a raised outer rim 34 at its periphery and a pair of inner concentric circular ridges 36 and 38 defining shallow liquid reservoirs. Handles are formed on either side with wire brackets 40 having a curved central portion welded to the outer surface of the rim 34 between two upwardly extending prongs that engage either end of a wooden dowel 42 or other form of heat insulating handle The handles permit the base 14 with the other structural elements in place on it to be moved after heating of the tortillas. If desired, a simple wire metal stand 44 can be provided with the warmer assembly with the ends of the short legs covered by heat insulating pads to prevent marring of the table surface In use, the desired number of tortillas for a meal are taken from the package in which they are sold. Half are placed on the upper fixed plate 20, and the other half on the removable metal plate 22 which is then replaced with the back bent edge 31 in the slot 30 so that both stacks of tortillas are supported in a substantially horizontal attitude on the holder. The holder 12, as shown in FIG. 2, is then placed upright on the top surface of the base 14 with the dimples 28 resting outside of the outer circular ridge 36. A desired amount of water is then added to the shallow liquid reservoirs formed within the concentric circular ridges 36 and 38. With only a few tortillas, water may be added only to the central reservoir defined within the smaller ridge 38, but with a full load, water may also be added to the outer reservoir area defined within the larger ridge 36.

The holder structure 12, with tortillas stacked on it, is placed on the base 14, and the cover 10 is lowered over it until its bottom edge rests on the upper surface of the base 14 within the raised outer rim 34 which forms a snug fit around the outer edges of the cover bottom. The entire assembly is then placed over an open flame of a gas stove or the heater element of an electric stove until condensed steam can be seen escaping at the edges. The weight of the metal cover 10 and its snug fit around the rim 34 acts to seal in the heated water vapor to create a slight overpressure so that the moist air permeates the tortillas, particularly the ones on top of each stack.

At the same time, heat transferred to the upper and intermediate metal plates 20 and 22 to the bottom tortilla in each stack which retains its natural moisture because the overlying tortillas on top prevent its escape.

When the warmer assembly is removed from the flame or heater element by grasping the insulated portion 42 with the handles 40 attached to the base 14, a reverse effect occurs where cooling produced by the loss of heat through the metal base 14 and the cover 10 causes the hot vapor and air inside to contract. This tends to force the lower edge of the cover 10 down more tightly against the abutting upper surface of the base 14 thereby a sealing off of heat and moisture so the warming effect within can be maintained for a considerable period of time. When those dining want a tortilla, the cover 10 is lifted by the insulated handle 16 on top so that a tortilla can be removed from the top of each stack. If more are desired at that time, the next tortilla down may be removed, or if that one is not fully warmed, then the stack can be turned over to get the warm tortilla at the bottom of the stack that has been in contact with the hot metal surface of the adjacent plate 20 or 22. Generally though, the tortillas further down in the stack will usually have been heated well enough in a relatively short period.

Another preferred variation of the holder structure for larger numbers of tortillas, such as may be necessary in a restaurant or with larger families is illustrated in FIG. 3. In this case, the basic holder structure consists of an integral metal stamping with a bottom fixed metal plate 46 having an upstanding tab portion 48 bent perpendicularly. The edges of the vertical tab 48 are bent inwardly towards one another with substantially horizontal slots cut at increasingly upward slants to receive the edges of several of circular metal plates 50 that are the approximate size and shape of a standard tortilla. To make the structure lighter, non-essential metal areas in the tabs can be removed in the stamping process, as shown in FIG. 3. Of course, with the increased vertical height of the higher capacity holder structure shown in FIG. 3, the cover 10 would have to be more elongated vertically to accommodate the additional heigth. Also, it might be desirable to have additional liquid reservoir areas or otherwise increase the water capacity on the upper surface of the base 14 so as to accommodate the more tortillas.

It should be understood that the two preferred embodiments shown and described herein are merely illustrative of the invention, and those skilled in the art can readily envision various modifications of the structure, materials and arrangement of the parts without departing from the spirit and scope of the present invention as set forth in the appended claims.

What is claimed is:

1. An assembly for warming tortillas and the like comprising:

a substantially flat base means having a circular configuration with a continuous raiser outer rim at its periphery and an upper surface with an interior configuration defining shallow liquid reservoir areas consisting of concentric circular areas within raised circular ridges surrounding the center of said base means;

a cylindrical base cover means having a lower open end shaped to fit snugly within the raised outer rim of the base means and having vertically extending side portions and an upper closed end to form a cylindrically shaped sealed enclosure above the base; and a holder structure defining at least one substantially horizontal plate on which tortillas may be stacked to be disposed substantially horizontal above said upper surface of said base means within said enclosure.

2. The tortilla warmer assembly of claim 1 wherein:
said holder structure consists of lightweight sheet metal and further comprises an upright tab attached along one edge of said holder structure;
a slot being formed in said tab; and
said holder structure further comprises at least one removable thin metal plate insertable in said slot;

* * * * *